July 8, 1941.  C. W. REI  2,248,120

SEAT BACK CUSHION MOUNTING

Filed Nov. 20, 1939  2 Sheets-Sheet 1

INVENTOR.
CHARLES W. REI.
BY Barnes, Kisselle, Laughlin & Raisch
ATTORNEYS.

July 8, 1941.  C. W. REI  2,248,120
SEAT BACK CUSHION MOUNTING
Filed Nov. 20, 1939  2 Sheets-Sheet 2
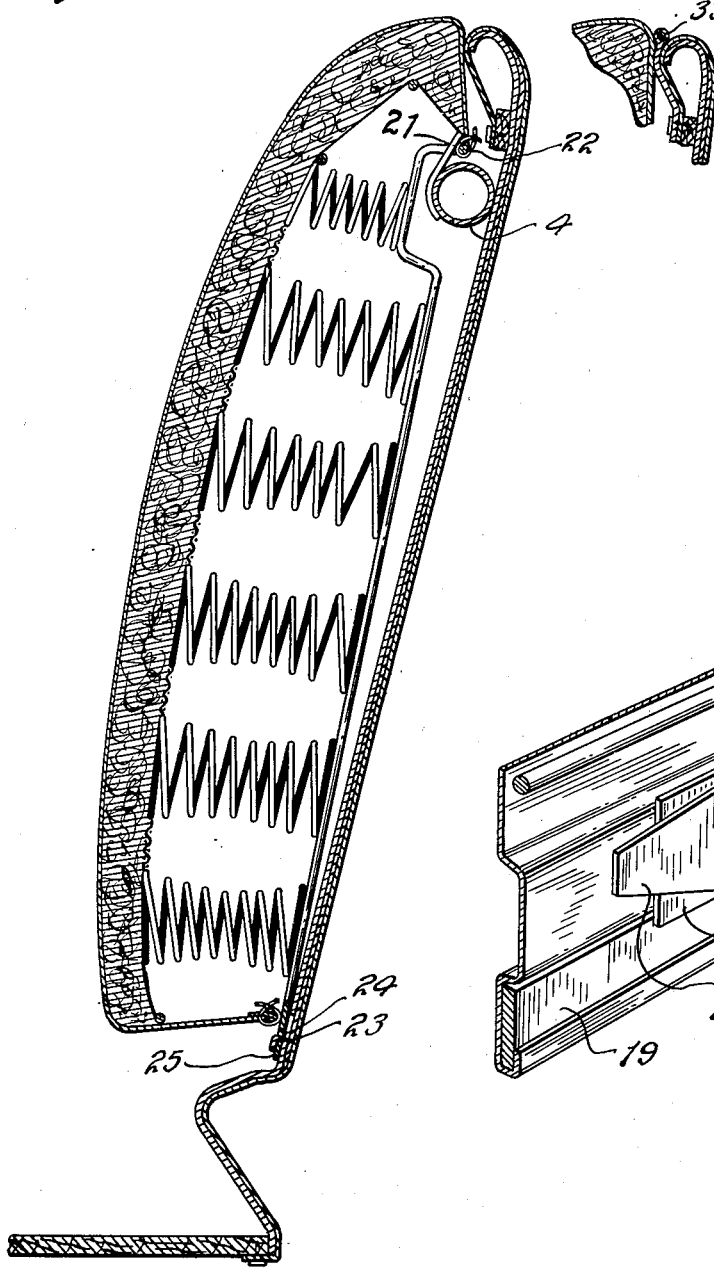
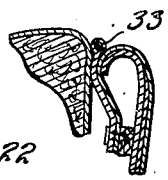
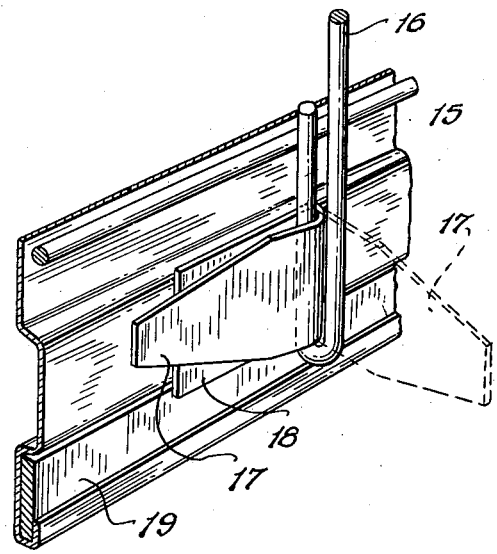
INVENTOR.
CHARLES W. REI.
BY
ATTORNEYS.

Patented July 8, 1941

2,248,120

UNITED STATES PATENT OFFICE 2,248,120

SEAT BACK CUSHION MOUNTING

Charles W. Rei, Detroit, Mich., assignor to General Motors Corporation, Detroit, Mich., a corporation of Delaware Application November 20, 1939, Serial No. 305,243

4 Claims. (Cl. 155—184)

This invention relates to seat back cushion mountings in automobile bodies and has for its object an improved mounting in which the seat may very easily and simply be secured in place.

In the drawings:

Fig. 3 is an enlarged detail of the bottom fastener.

Fig. 4 is a vertical section of a modified form.

Fig. 5 is a detail of a slight modification of the form shown in Fig. 4 with a welt in place.

Figure 1:
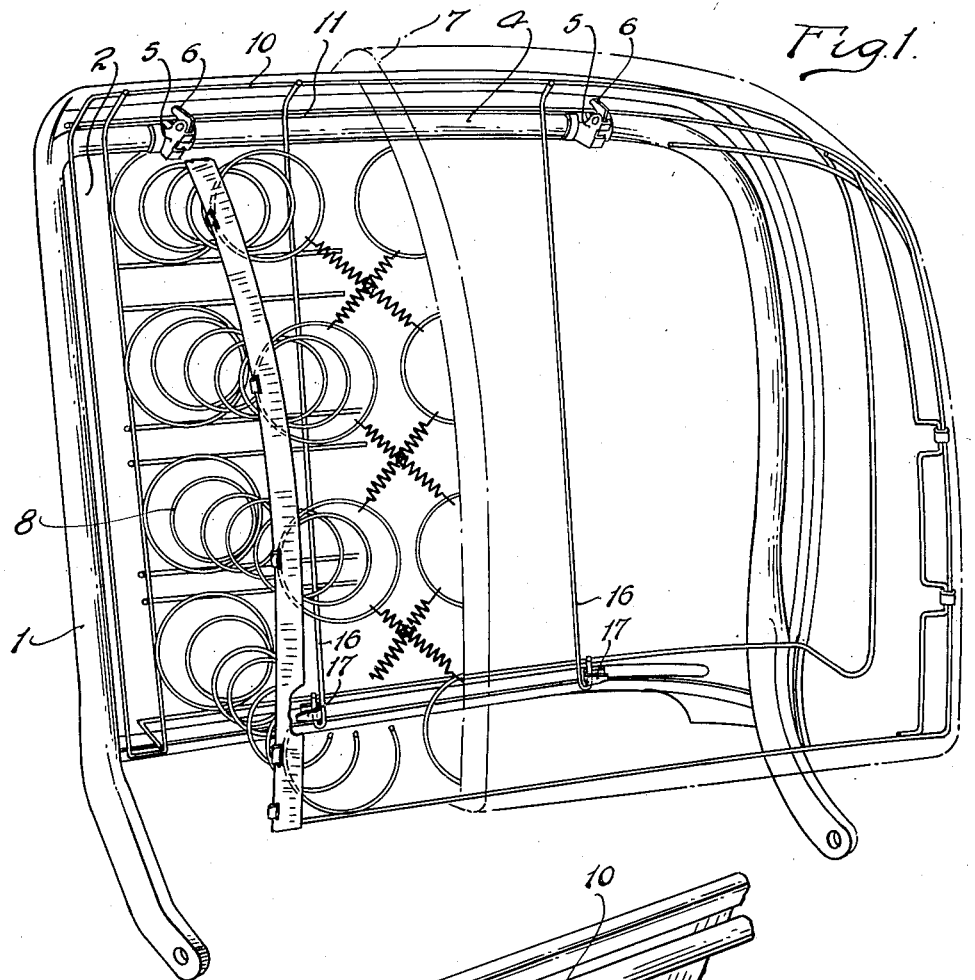
Fig. 1 is a perspective of a seat cushion partly broken away and a seat back frame.

The seat frame is made up of side uprights 1, and a seat back plate 2, which is folded over at the top to embrace a reinforcing bar 3. A reinforcing tube 4 is welded to the seat back plate. Spot-welded to the tube are a pair of latch or retainer clip brackets 5. This bracket has arms 30 with half sleeve terminals 31, which embrace and are spot-welded to the tube. To these are pivoted clips or latches 6 which are simply bifurcated small hinged plates.

Figure 2:
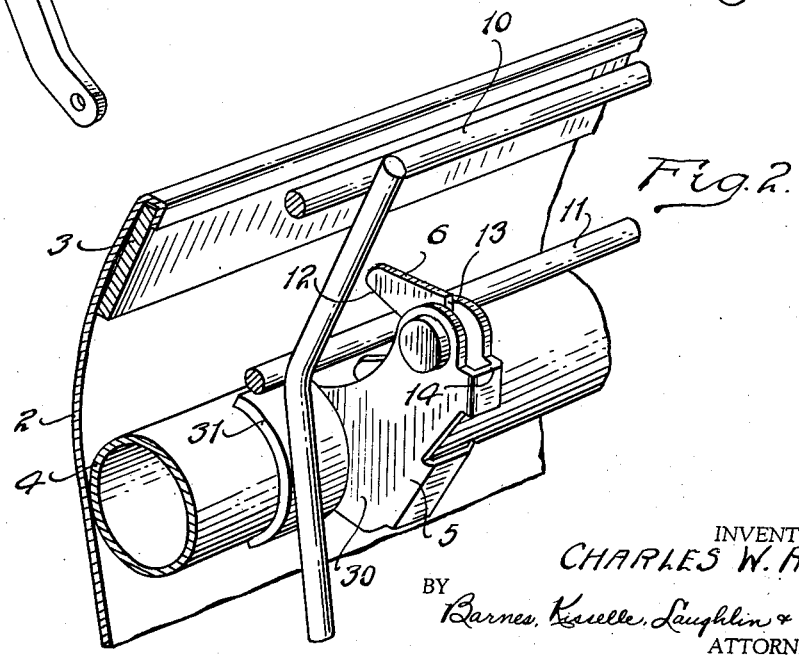
Fig. 2 is an enlarged detail showing how the upper latch holds the spring frame.

The seat cushion is made up of the usual upholstery and seat back springs 8 carried on a seat back frame, at the top and rear of this frame are a pair of cross wires. The wire 11 can be hooked into the recesses 12 in the latches when these are resting in their upright or open position which they will occupy when turned upwardly so shoulder 13 rests upon the rest 14 on the yoke of the bracket. The cushion and frame is then pulled down to the position shown in Figs. 1 and 2. The hooks 15 on the ends of the vertical cross wires 16 are then threaded over the wings 17 of the clips 18 which are spot-welded to the bar 19 of the seat back frame. The wings are then bent back to the full line position shown in Figs. 1 and 3. This locks the seat cushion in position because, obviously, the seat cannot be lifted so that latch 6 can release wire 11 at the top of the frame.

Another form of the invention is found in Figs. 4 and 5. Here, the impaling clip or points 21 are spot-welded to the cross tube 4. The seat cushion is impaled upon the points by hooking the cross wire under the clips or points, the point piercing the upholstery as shown in Fig. 4. The cushion is then drawn down and hooked over ears 23, which pass through the perforations 24 in the vertical cross ribbons 25 which protrude below the bottom of the cushion. These ears are then bent over to the position shown in Fig. 4.

In Fig. 5, a welt 33 is interposed between the turned over upholstery at the top and the rolled over seat back plate.

What I claim is:

1. A mounting for a seat back cushion, comprising a supporting framework, a clip having an open recess therein rotatably mounted upon said framework, a spring unit provided with a spring supporting frame having a cross-rod secured to said frame, said cross-rod being engaged in the recess in said clip with a portion of said clip overlying said cross-rod, said clip being rotatable rearwardly from a position in which said recess opens upwardly to the position in which a portion of said clip overlies said cross-rod, whereby said cross-rod may be hooked into said recess and the spring frame drawn down to rotate the clip to hold the spring supporting frame securely upon said framework, and means securing said spring supporting frame to the framework in the down position.

2. A mounting for a seat back cushion, comprising a supporting framework, a clip having an open recess therein rotatably mounted upon said framework, a spring unit provided with a spring supporting frame having a cross-rod secured to said frame, said cross-rod being engaged in the recess in said clip with a portion of said clip overlying said cross-rod, said clip being rotatable rearwardly from a position in which said recess opens upwardly to the position in which a portion of said clip overlies said cross-rod, whereby said cross-rod may be hooked into said recess and the spring frame drawn down to rotate the clip to hold the spring supporting frame securely upon said framework, and means securing said spring supporting frame to the framework in the down position, comprising a hook on the lower portion of the spring frame threaded over a wing of a clip which is then bent in place over the hook.

3. A mounting for a seat back cushion, comprising a supporting framework having a cross tube near the top, a clip having an open recess therein rotatably mounted upon said framework, a spring unit provided with a spring supporting frame having a cross-rod secured to said frame, said cross-rod being engaged in the recess in said clip with a portion of said clip overlying said cross-rod, said clip being rotatable rearwardly from a position in which said recess opens upwardly to the position in which a portion of said clip overlies said cross-rod, whereby said cross-rod may be hooked into said recess and the spring frame drawn down to rotate the clip to hold the spring supporting frame securely upon said framework, and means securing said spring supporting frame to the framework in the down position, the said clip being a recessed plate and a bracket welded to said cross tube and pivotally supporting the plate.

4. A mounting for a seat back cushion, comprising a supporting framework having a cross tube near the top, a clip having an open recess therein rotatably mounted upon said framework, a spring unit provided with a spring supporting frame having a cross-rod secured to said frame, said cross-rod being engaged in the recess in said clip with a portion of said clip overlying said cross-rod, said clip being rotatable rearwardly from a position in which said recess opens upwardly to the position in which a portion of said clip overlies said cross-rod, whereby said cross-rod may be hooked into said recess and the spring frame drawn to rotate the clip to hold the spring supporting frame securely upon said framework, and means securing said spring supporting frame to the framework in the down position, the said clip being a recessed plate, a bracket welded to said cross tube and pivotally supporting the clip, said bracket being a stamping folded to form a yoke to which the recessed clip is pivoted and two arms with half sleeve terminals which embrace the tube and are welded thereto.

CHARLES W. REI.